US010425166B2

United States Patent
Yamauchi et al.

(10) Patent No.: US 10,425,166 B2
(45) Date of Patent: Sep. 24, 2019

(54) OPTICAL TRANSMITTER, OPTICAL TRANSMISSION APPARATUS, AND OPTICAL MODULATION METHOD

(71) Applicant: FUJITSU LIMITED, Kawasaki-shi, Kanagawa (JP)

(72) Inventors: Tomohiro Yamauchi, Kawasaki (JP); Tomofumi Oyama, Kawasaki (JP); Takahito Tanimura, Yokohama (JP); Guoxiu Huang, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/030,312

(22) Filed: Jul. 9, 2018

(65) Prior Publication Data

US 2019/0020418 A1 Jan. 17, 2019

(30) Foreign Application Priority Data

Jul. 14, 2017 (JP) .................................. 2017-138365

(51) Int. Cl.
*H04B 10/54* (2013.01)
*H04B 10/516* (2013.01)
*H04B 10/556* (2013.01)
*G02F 1/21* (2006.01)
*G02F 1/225* (2006.01)

(52) U.S. Cl.
CPC ....... *H04B 10/541* (2013.01); *H04B 10/5161* (2013.01); *H04B 10/5561* (2013.01); *G02F 1/225* (2013.01); *G02F 2001/212* (2013.01)

(58) Field of Classification Search
CPC .............. H04B 10/541; H04B 10/5161; H04B 10/5561; G02F 1/225; G02F 2001/212

USPC ......................................................... 398/186
See application file for complete search history.

(56) References Cited

U.S. PATENT DOCUMENTS

| 5,550,667 A * | 8/1996 | Krimmel ............ H04B 10/2537 398/193 |
| 9,014,572 B2* | 4/2015 | Akiyama ......... H04B 10/50575 398/192 |
| 9,853,736 B2* | 12/2017 | Shirakawa ......... H04B 10/0799 |

(Continued)

FOREIGN PATENT DOCUMENTS

| JP | 63-13017 | 1/1988 |
| JP | 2006-339760 | 12/2006 |

(Continued)

OTHER PUBLICATIONS

A. Mecozzi et al., "Kramers-Kronig coherent receiver," Optica vol. 3, No. 11, pp. 1220-1227, Nov. 2016 (8 pages).

(Continued)

*Primary Examiner* — Dalzid E Singh
(74) *Attorney, Agent, or Firm* — Fujitsu Patent Center

(57) ABSTRACT

An optical transmitter includes, an optical modulator that multilevel-modulates light outputted from a light source, and a processor that outputs a first drive voltage for driving the optical modulator according to an amplitude component when transmission data is symbol-mapped and a second drive voltage for driving the optical modulator according to a phase component when the transmission data is symbol-mapped. A phase shift of phase modulation by the second drive voltage outputted from the processor is greater than 0 and less than $\pi/2$.

15 Claims, 19 Drawing Sheets

(56) References Cited

U.S. PATENT DOCUMENTS

| | | | |
|---|---|---|---|
| 2006/0269294 A1 | 11/2006 | Kikuchi | |
| 2009/0238580 A1 | 9/2009 | Kikuchi | |
| 2009/0324253 A1 | 12/2009 | Winzer | |
| 2011/0317255 A1* | 12/2011 | Shukunami | H01S 3/06766 359/333 |
| 2012/0281988 A1* | 11/2012 | Kikuchi | H04B 10/5561 398/159 |
| 2017/0366263 A1* | 12/2017 | Turgeon | H04B 10/118 |

FOREIGN PATENT DOCUMENTS

| | | |
|---|---|---|
| JP | 2009-231881 | 10/2009 |
| JP | 2011-527026 | 10/2011 |
| WO | 2011/083575 | 7/2011 |

OTHER PUBLICATIONS

X. Chen et al., "218-Gb/s Single-Wavelength, Single-Polarization, Single-Photodiode Transmission Over 125-km of Standard Singlemode Fiber Using Kramers-Kronig Detection," OFC 2017, Th5B.6, 2017 (3 pages).

* cited by examiner

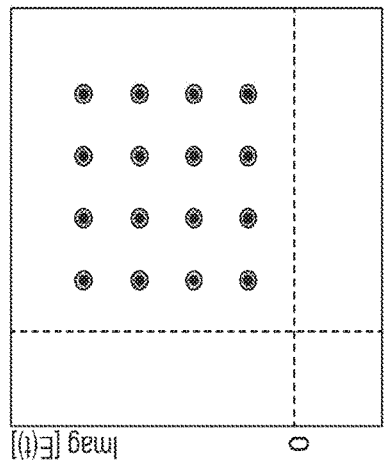
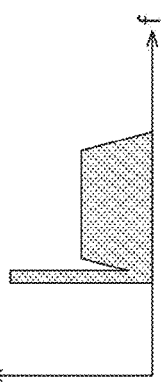
FIG. 3C
SYMBOL FALLS INTO SINGLE QUADRANT OF I-Q PLANE (SATISFYING MINIMUM PHASE)
OPTICAL SIGNAL SPECTRUM IN CASE OF FIG. 3C
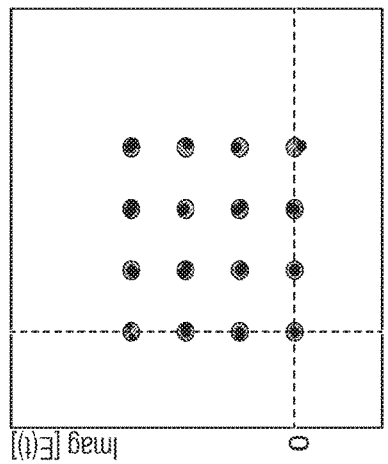
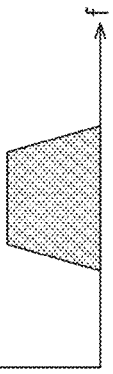
FIG. 3B
SYMBOL DOES NOT FALL INTO SINGLE QUADRANT OF I-Q PLANE (NOT MINIMUM PHASE)
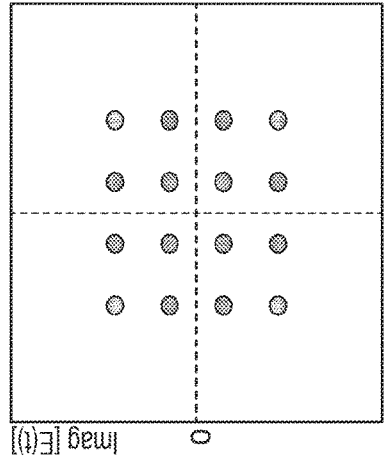
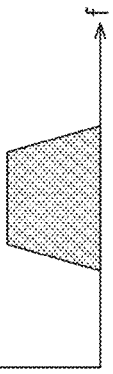
FIG. 3A
SYMBOL DOES NOT FALL INTO SINGLE QUADRANT OF I-Q PLANE (NOT MINIMUM PHASE)
OPTICAL SIGNAL SPECTRUM IN CASE OF FIG. 3A

FIG. 12

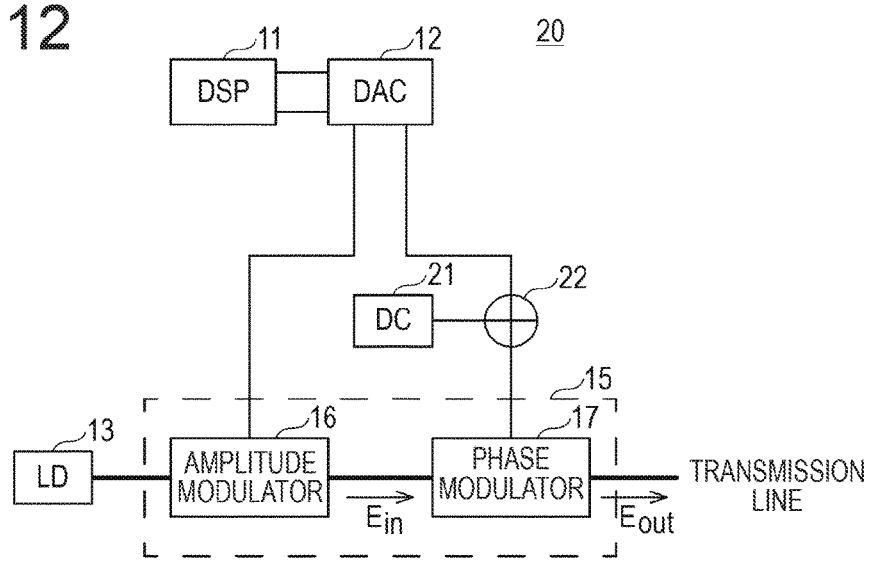

- OPTICAL INPUT/OUTPUT CHARACTERISTICS WHEN NO BIAS IS APPLIED $$E_{out}(t) = E_{in}(t)\exp(j\delta(t)\Delta\varphi)$$

$$\frac{\varphi_{min}}{\Delta\varphi} < \delta(t) < \frac{\varphi_{max}}{\Delta\varphi}$$

- OPTICAL INPUT/OUTPUT CHARACTERISTICS WHEN BIAS IS APPLIED $$E_{out}(t) = E_{in}(t)\exp(j(\delta(t)+\delta_{bias})\Delta\varphi)$$

$$\frac{\varphi_{min}}{\Delta\varphi} - \delta_{bias} < \delta(t) < \frac{\varphi_{max}}{\Delta\varphi} - \delta_{bias}$$

| | |
|---|---|
| $E_{in}(t)$, $E_{out}(t)$ | INPUT/OUTPUT OPTICAL SIGNAL |
| $\Delta\varphi$ | VARIABLE PHASE WIDTH OF MODULATOR |
| $\delta(t)$ | NORMALIZED MODULATOR INPUT VOLTAGE |
| $\varphi_{min}$, $\varphi_{max}$ | MINIMUM AND MAXIMUM VALUES OF MODULATION PHASE AMOUNT |
| $\delta_{bias}$ | BIAS OF ADDED VOLTAGE |

FIG. 14

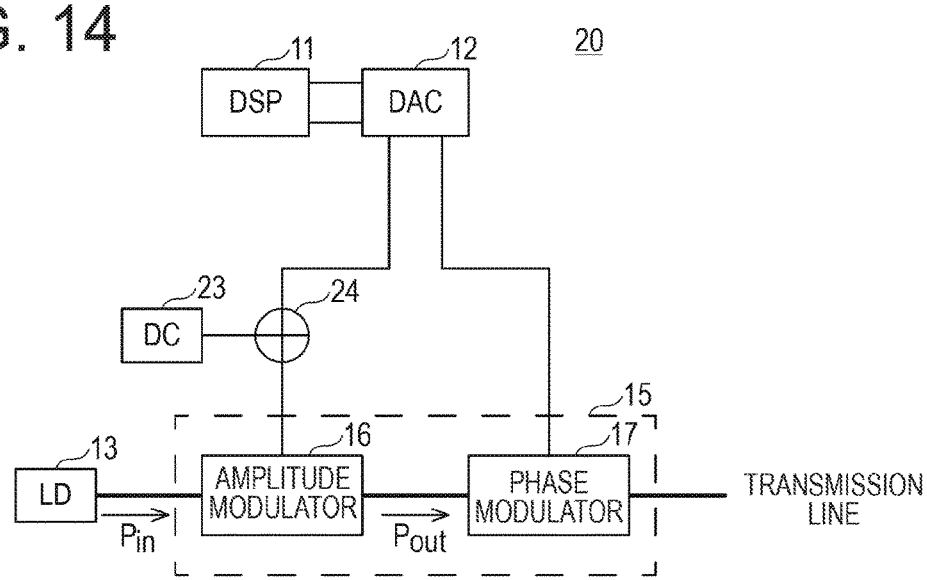

- OPTICAL INPUT/OUTPUT CHARACTERISTICS WHEN NO BIAS IS APPLIED $$P_{out}(t) = P_{in}(t)\cos^2[\frac{\pi}{2}(\frac{1}{2}-k(\delta(t)-\frac{1}{2}))]$$

$$\frac{1}{k}(\frac{1}{2}-\frac{2}{\pi}\arccos\sqrt{A_{min}})+\frac{1}{2} < \delta(t) < \frac{1}{k}(\frac{1}{2}-\frac{2}{\pi}\arccos\sqrt{A_{max}})+\frac{1}{2}$$

- OPTICAL INPUT/OUTPUT CHARACTERISTICS WHEN BIAS IS APPLIED $$P_{out}(t) = P_{in}(t)\cos^2[\frac{\pi}{2}(\frac{1}{2}-k(\delta(t)+\delta_{bias}-\frac{1}{2}))]$$

$$\frac{1}{k}(\frac{1}{2}-\frac{2}{\pi}\arccos\sqrt{A_{min}})+\frac{1}{2}-\delta_{bias} < \delta(t) < \frac{1}{k}(\frac{1}{2}-\frac{2}{\pi}\arccos\sqrt{A_{max}})+\frac{1}{2}-\delta_{bias}$$

| $P_{in}(t), P_{out}(t)$ | INPUT/OUTPUT OPTICAL POWER |
|---|---|
| k | COEFFICIENT UNIQUELY DETERMINED BY EXTINCTION RATIO OF MODULATOR |
| $\delta(t)$ | NORMALIZED MODULATOR INPUT VOLTAGE |
| $A_{min}, A_{max}$ | MINIMUM AND MAXIMUM VALUES OF Pout/Pin |
| $\delta_{bias}$ | BIAS OF ADDED VOLTAGE |

FIG. 16

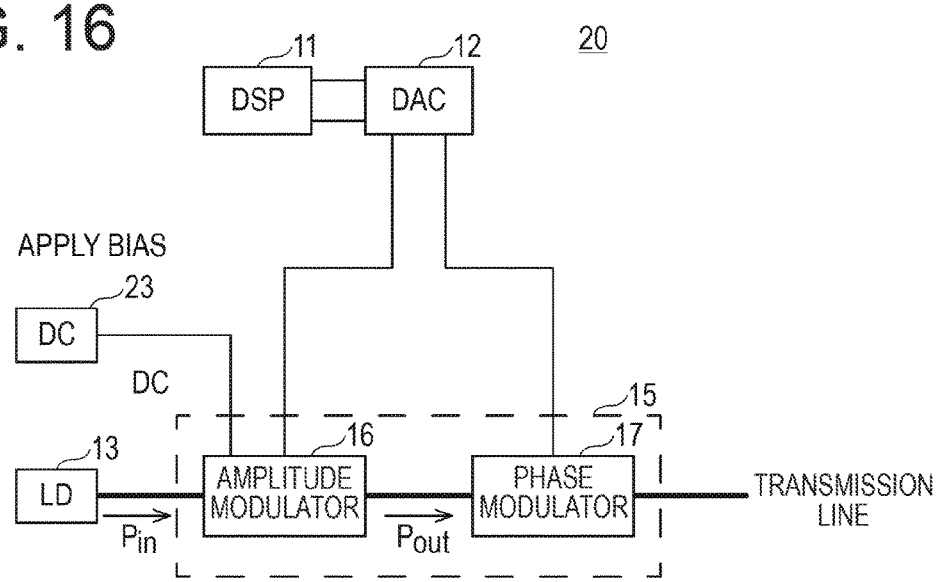

- OPTICAL INPUT/OUTPUT CHARACTERISTICS WHEN NO BIAS IS APPLIED $$P_{out}(t) = P_{in}(t)\cos^2[\frac{\pi}{2}(\frac{1}{2} - k(\delta(t) - \frac{1}{2}))]$$

$$\frac{1}{k}(\frac{1}{2} - \frac{2}{\pi}\arccos\sqrt{A_{max}}) + \frac{1}{2} < \delta(t) < \frac{1}{k}(\frac{1}{2} - \frac{2}{\pi}\arccos\sqrt{A_{min}}) + \frac{1}{2}$$

- OPTICAL INPUT/OUTPUT CHARACTERISTICS WHEN BIAS IS APPLIED $$P_{out}(t) = P_{in}(t)\cos^2[\frac{\pi}{2}(\frac{1}{2} - k(\delta(t) + \delta_{bias} - \frac{1}{2}))]$$

$$\frac{1}{k}(\frac{1}{2} - \frac{2}{\pi}\arccos\sqrt{A_{max}}) + \frac{1}{2} - \delta_{bias} < \delta(t) < \frac{1}{k}(\frac{1}{2} - \frac{2}{\pi}\arccos\sqrt{A_{min}}) + \frac{1}{2} - \delta_{bias}$$

| $P_{in}(t), P_{out}(t)$ | INPUT/OUTPUT OPTICAL POWER |
| --- | --- |
| k | COEFFICIENT UNIQUELY DETERMINED BY EXTINCTION RATIO OF MODULATOR |
| $\delta(t)$ | NORMALIZED MODULATOR INPUT VOLTAGE |
| $A_{min}, A_{max}$ | MINIMUM AND MAXIMUM VALUES OF Pout/Pin |
| $\delta_{bias}$ | BIAS OF ADDED VOLTAGE |

OPTICAL TRANSMITTER, OPTICAL TRANSMISSION APPARATUS, AND OPTICAL MODULATION METHOD

CROSS-REFERENCE TO RELATED APPLICATION

This application is based upon and claims the benefit of priority of the prior Japanese Patent Application No. 2017-138365, filed on Jul. 14, 2017, the entire contents of which are incorporated herein by reference.

FIELD

The embodiments discussed herein are related to an optical transmitter, a modulation method, and an optical transmission apparatus.

BACKGROUND

A technology called a digital coherent optical transmission utilizes the intensity and phase (and further polarization) of light by digital signal processing to increase the transmission efficiency and hence implement a large capacity long distance transmission. As illustrated in FIGS. 1A to 1C, as a kind of digital modulation, IQ modulation is performed which represents digital data as a symbol point on an orthogonal coordinate having an I axis (an in-phase axis with a carrier wave) and a Q axis (a quadrature phase axis orthogonal to the carrier wave) (see, e.g., FIG. 1C). An IQ modulator modulates light output from a laser diode (LD) into an in-phase optical signal and an orthogonal quadrature phase optical signal by an analog electric signal (see, e.g., FIG. 1A). The analog electric signal represents electric field information of the symbol point. A receiving side extracts a beat signal by causing signal light and locally-oscillated light to interfere with each other to detect information on the phase and intensity of the received light. Since the beat signal is subjected to a digital signal processing such as a dispersion compensation and the waveform of the transmitted signal is identified and reproduced, the reception sensitivity is improved.

In recent years, a technology called a Kramers-Kronig (hereinafter, abbreviated as "KK") detection method has attracted attention (see, e.g., Non-Patent Document 1 and Non-Patent Document 2). In the KK detection method, signal light is transmitted with a signal waveform including a modulated light spectrum of a certain bandwidth and a continuous light (carrier) spectrum which protrudes at one edge of the modulated light spectrum. A receiving side can restore the phase of a received signal from the output intensity of a photodiode (PD) as long as the received signal satisfies the minimum phase system. The KK detection method enables a dispersion compensation while performing a direct detection, thereby further extending a transmission distance compared to the general direct detection method. It is expected that the KK detection method will be applied to short-distance optical networks and metro networks.

A transmitter configuration using an IQ modulator in the optical transmission of the KK detection method has been reported (see Non-Patent Document 2 as described below). As illustrated in FIG. 1B, for the IQ modulator, a Mach-Zehnder (MZ) interferometer type optical modulator is generally used for each of the I axis and the Q axis. In the MZ interferometer type optical modulator, electrodes for applying a phase change are arranged in the vicinity of a pair of optical waveguides forming an interferometer. In the IQ modulator, two MZ type modulators provided with electrodes are arranged in parallel to give a phase difference of 90° between the I axis and the Q axis. This may cause a problem of complicated configuration such as an increased size of the modulator.

Related techniques are disclosed in, for example, A. Mecozzi, et al., "Kramers-Kronig coherent receiver, "Optica 3, 1220-1227 (2016) (Non-Patent Document 1), and Chen, et al., "218-Gb/s Single-Wavelength, Single-Polarization, Single-Photodiode Transmission Over 125-km of Standard Singlemode Fiber Using Kramers-Kronig Detection," OFC 2017, Th5B. 6 (2017) (Non-Patent Document 2).

SUMMARY

According to an aspect of the embodiments, an optical transmitter includes, an optical modulator that multilevel-modulates light outputted from a light source, and a processor that outputs a first drive voltage for driving the optical modulator according to an amplitude component when transmission data is symbol-mapped and a second drive voltage for driving the optical modulator according to a phase component when the transmission data is symbol-mapped. A phase shift of phase modulation by the second drive voltage outputted from the processor is greater than 0 and less than $\pi/2$.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

BRIEF DESCRIPTION OF DRAWINGS

FIGS. 3A to 3C are views illustrating a symbol mapping to an I-Q plane;

FIG. 12 illustrates a configuration example in which a bias is added to a tandem type optical modulator;

FIG. 14 illustrates another configuration example in which a bias is added to a tandem type optical modulator;

FIG. 16 illustrates a further configuration example in which a bias is added to a tandem type optical modulator;

DESCRIPTION OF EMBODIMENTS

Figure 1A:
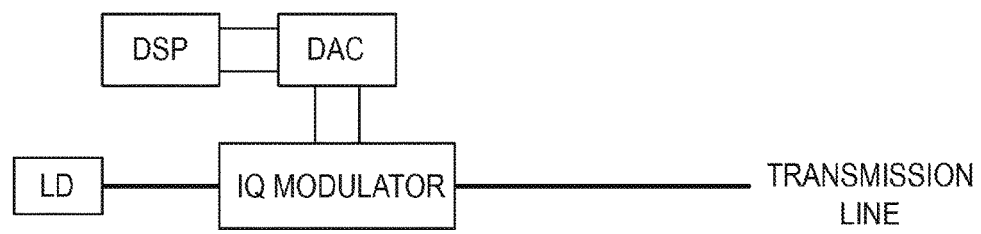
FIGS. 1A to 1C are views illustrating a conventional transmitter configuration using an IQ modulator.
Figure 1B:
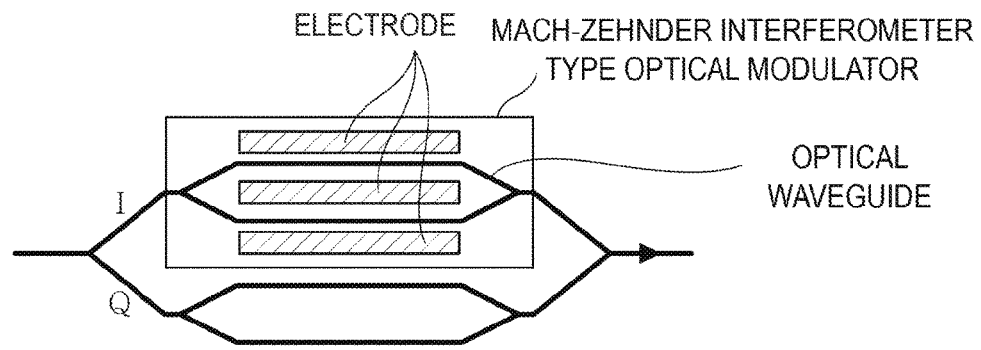
Figure 1C:
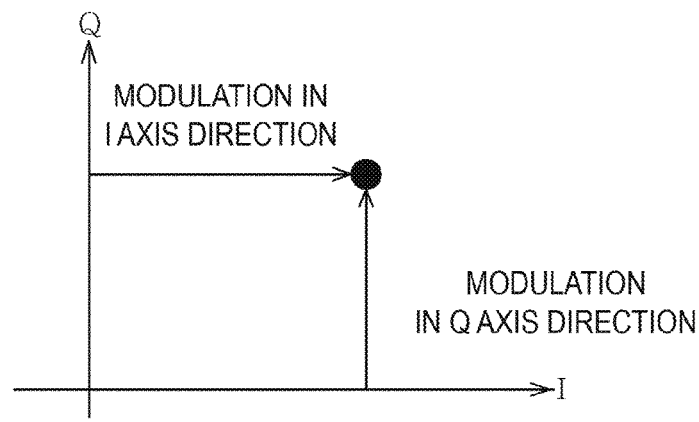
Figure 2A:
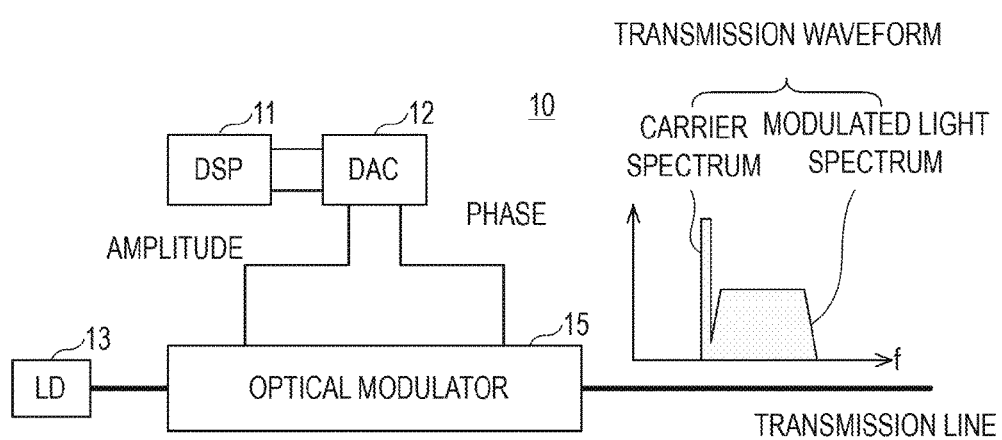
FIGS. 2A and 2B are views illustrating the basic configuration of an optical transmitter according to an embodiment.
Figure 2B:
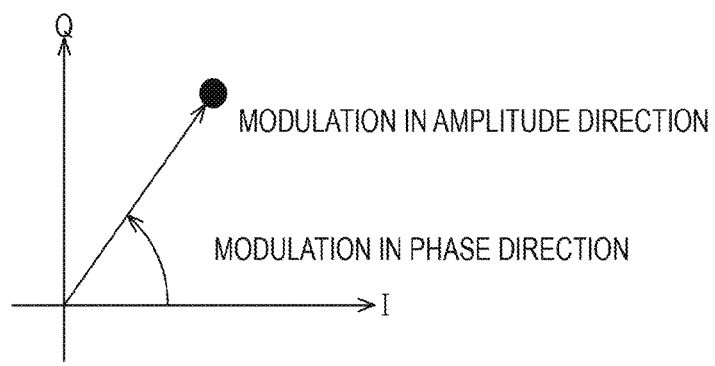

FIGS. 2A and 2B are views illustrating the basic configuration of an optical transmitter 10 according to an embodiment. The optical transmitter 10 modulates signal light with a modulation method corresponding to a KK detection method and simplifies the configuration of a modulator. The optical transmitter 10 includes a processor (DSP) 11, a digital-to-analog converter (DAC) 12, an LD 13 serving as a light source, and an optical modulator 15.

The processor 11 outputs a first drive voltage for amplitude modulation and a second drive voltage for phase modulation according to input transmission data. At this time, the order of the amplitude modulation and the phase modulation and the positional relationship between driving points are not questioned.

An MZ interferometer type modulator is used in one or less point of the optical modulator 15. In the case of the KK detection method, since the symbol does not shift an extinction point as will be described later, even when a modulation device with a somewhat low extinction ratio is used, it is still possible to demodulate and reproduce the phase information with high accuracy from the intensity of the received signal. This may make the configuration of the modulator as simple as possible.

In order to enable the KK detection, an optical signal which has a waveform including a modulated light spectrum $S_M$ having a certain bandwidth and a carrier (carrier wave) spectrum $S_C$ protruding at the edge of the modulated light spectrum is generated as an optical signal to be transmitted. In this example, the carrier spectrum $S_C$ is on the edge on the left side of the modulated light spectrum $S_M$ carrying the data information (low frequency side). The frequency of the carrier spectrum $S_C$ coincides with the frequency of the low frequency side edge of the modulated light spectrum $S_M$. In this signal spectrum, the KK detection becomes possible on the receiving side as long as the minimum phase is satisfied.

The minimum phase indicates that both a response and an inverse response are causal or that the zeros and poles of a transfer function are all stable. When the minimum phase condition is satisfied, the signal energy gathers around time 0 and the group delay characteristics become minimum. When the received signal satisfies the minimum phase, the relationship of Kramers-Cronig is established between an amplitude and a phase. In the stable minimum phase system, one of the phase characteristics and the amplitude characteristics may be obtained from the other by the Hilbert transformation.

The relationship of Kramers-Cronig is expressed as follows:

$Hi(\omega) = -(1/\pi\omega) Hr(\omega)$ $Hr(\omega) = -(1/\pi\omega) Hi(\omega)$ In this relationship, the real part and the imaginary part of the complex function are associated with each other. Herein, i represents the imaginary part and r represents the real part. This relational expression is also called a Hilbert transform pair. $Hi(\omega)$ is automatically determined when the frequency dependence of $Hr(\omega)$ is known. Accordingly, the receiving side may uniquely extract the phase from the intensity of the PD output and may accordingly demodulate the received signal. Due to the correlation between the phase and the amplitude, in the case of the KK detection method, a symbol point mapped on the I-Q plane (or complex plane) is defined by modulation in the amplitude direction and modulation in the phase direction.

FIGS. 3A to 3C are views illustrating a symbol mapping to the I-Q plane. Dots in FIG. 3A illustrate symbol points of a transmitted signal having a predetermined bandwidth. Here, a 16 QAM modulation signal is taken as an example. The symbols span four quadrants and do not satisfy the minimum phase system (transition from the zero point to an unstable system).

Dots in FIG. 3B illustrate the restored symbols. Although the center of this signal is at the position of $\pi/4$, the signal turns around the origin many times and the restored symbol protrude from the single quadrant. The signal energy diffuses from the signal center so as not to satisfy the minimum phase system, and the quality of the restoration signal is insufficient.

Dots in FIG. 3C illustrate the restored symbols of signal light modulated corresponding to the KK detection method. As in FIG. 3B, the signal center is located at $\pi/4$, but it is more distant from the origin than in FIG. 3B. Signal energy gathers around the signal center and does not transit the origin. The signal center is determined by the power of the carrier spectrum $S_C$. When the power of the carrier spectrum $S_C$ is weak, the signal center becomes closer to the origin and the symbols are arranged discretely. The signal energy diffuses beyond the extinction point, resulting in poor reception quality. When the power of the carrier spectrum $S_C$ is strong, the symbols are gathered away from the origin and the interval between the symbols becomes closer. In the KK modulation scheme of the embodiment, the power of the carrier and the power of the modulated light are distributed so that all the symbols fall into the single quadrant (minimum phase system) and the symbols may be correctly distinguished from each other. The power of the carrier spectrum $S_C$ included in the transmission wave of FIGS. 2A and 2B is set to be sufficiently large so that the minimum phase is satisfied. In the minimum phase system, since the symbol does not transit the extinction point (or zero point), even when a modulation device whose extinction ratio is not so large is used, phase information is restored from the signal intensity by Hilbert transformation on the receiving side.

<Example of Configuration of DSP>

Figure 4:
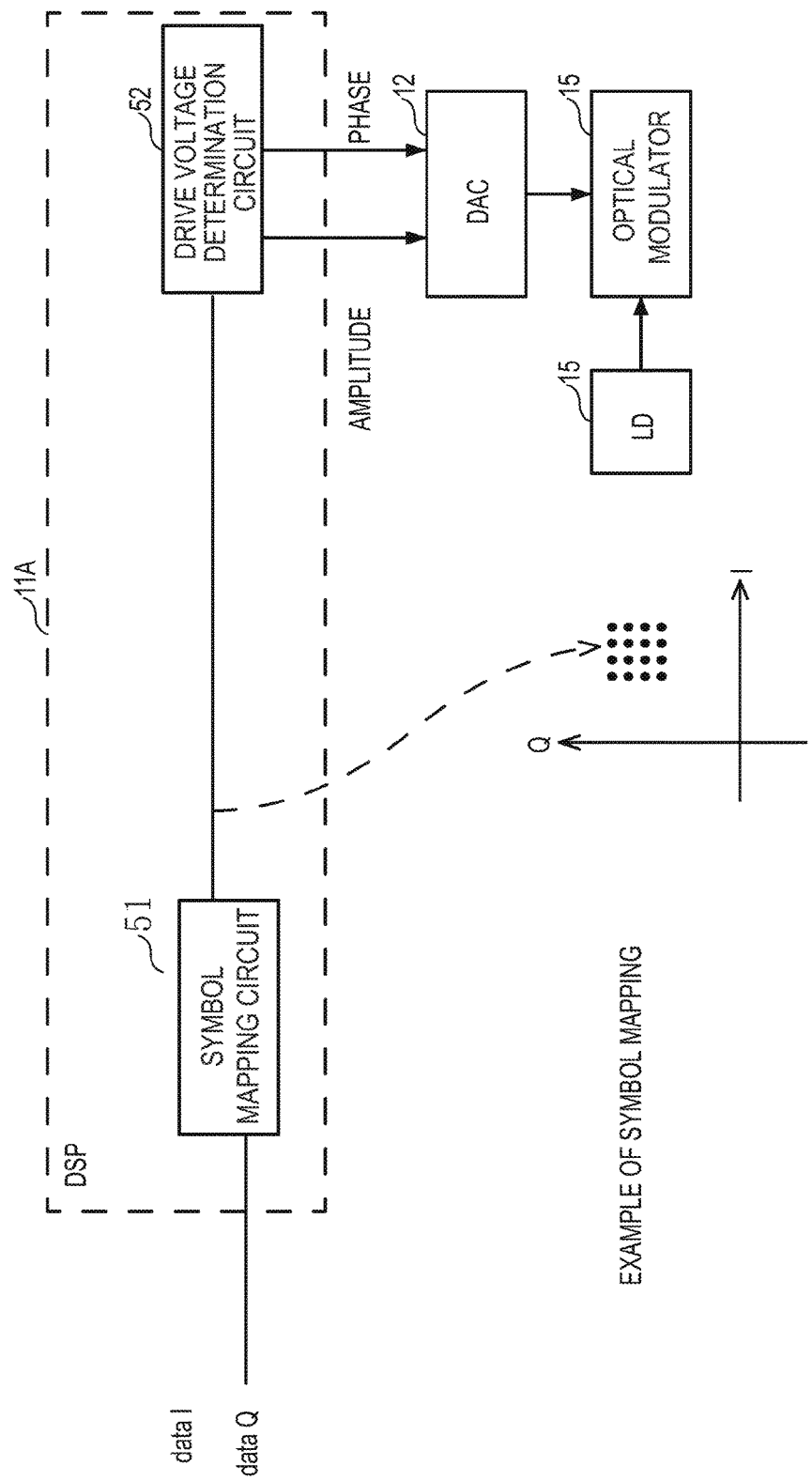
FIG. 4 is a view illustrating a configuration example of a DSP.

FIG. 4 illustrates the configuration of a DSP 11A as an example of the DSP 11. The DSP 11 drives the optical modulator 15 to generate a drive voltage (electric field signal) for generating a modulated optical signal satisfying the minimum phase conditions. The DSP 11A includes a symbol mapping circuit 51 that performs a mapping of the transmission data input from the outside to the DSP 11A on the complex plane, and a drive voltage determination circuit 52 that determines a first drive voltage for amplitude modulation and a second drive voltage for phase modulation. At this time, the order of the amplitude modulation and the phase modulation and the positional relationship between driving points may be reversed. The drive voltage determination circuit 52 outputs a voltage value representing the phase modulation amount and a voltage value representing the amplitude modulation amount. The output voltage is converted by the DAC 12 into an analog drive signal (modulated signal) which is then input to the optical modulator 15.

Figure 5:
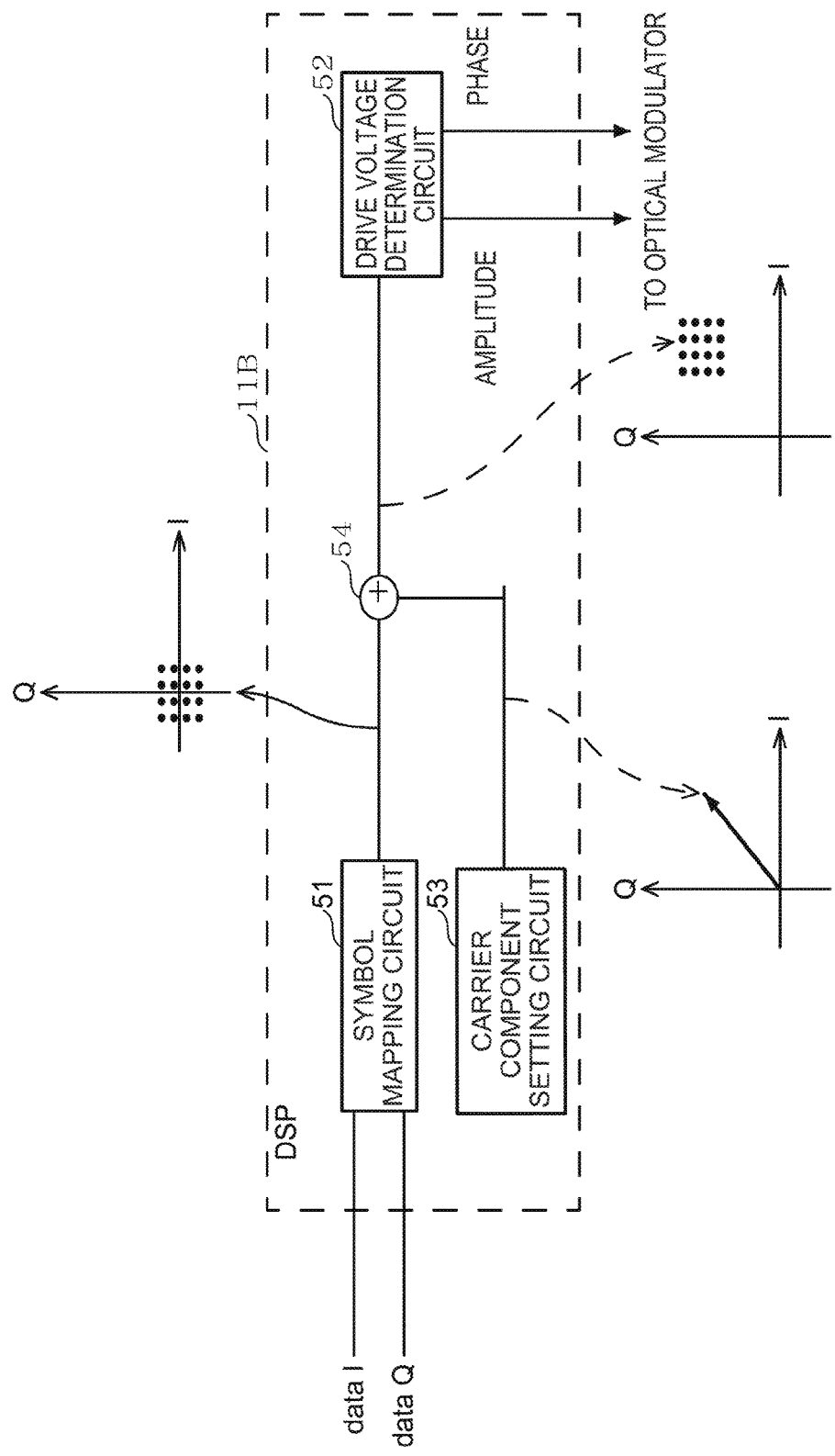
FIG. 5 is a view illustrating another configuration example of the DSP.

FIG. 5 illustrates a DSP 11B as another configuration example of the DSP 11. The same components as those of the DSP 11A in FIG. 4 are denoted by the same reference numerals and the explanation thereof will not be repeated. The DSP 11B is different from the DPS 11A of FIG. 4 in that the former includes an adder 54 and a carrier component setting circuit 53 and the outputs of the symbol mapping circuit 51 and the carrier component setting circuit 53 are combined by the adder 54.

The symbol mapping circuit 51 of FIG. 4 directly calculates the corresponding symbol point in the single quadrant based on the input transmission data. The symbol mapping circuit 51 of FIG. 5, for example, calculates a symbol point assuming that the signal center is zero (origin), and adds a carrier component set by the carrier component setting circuit 53 to the calculated symbol point so as to convert the symbol point to a symbol point in the single quadrant.

With this configuration, the transmission data is mapped to the symbol point in the single quadrant so as to satisfy the minimum phase conditions, thereby enabling the KK detection on the reception side.

Figure 6:
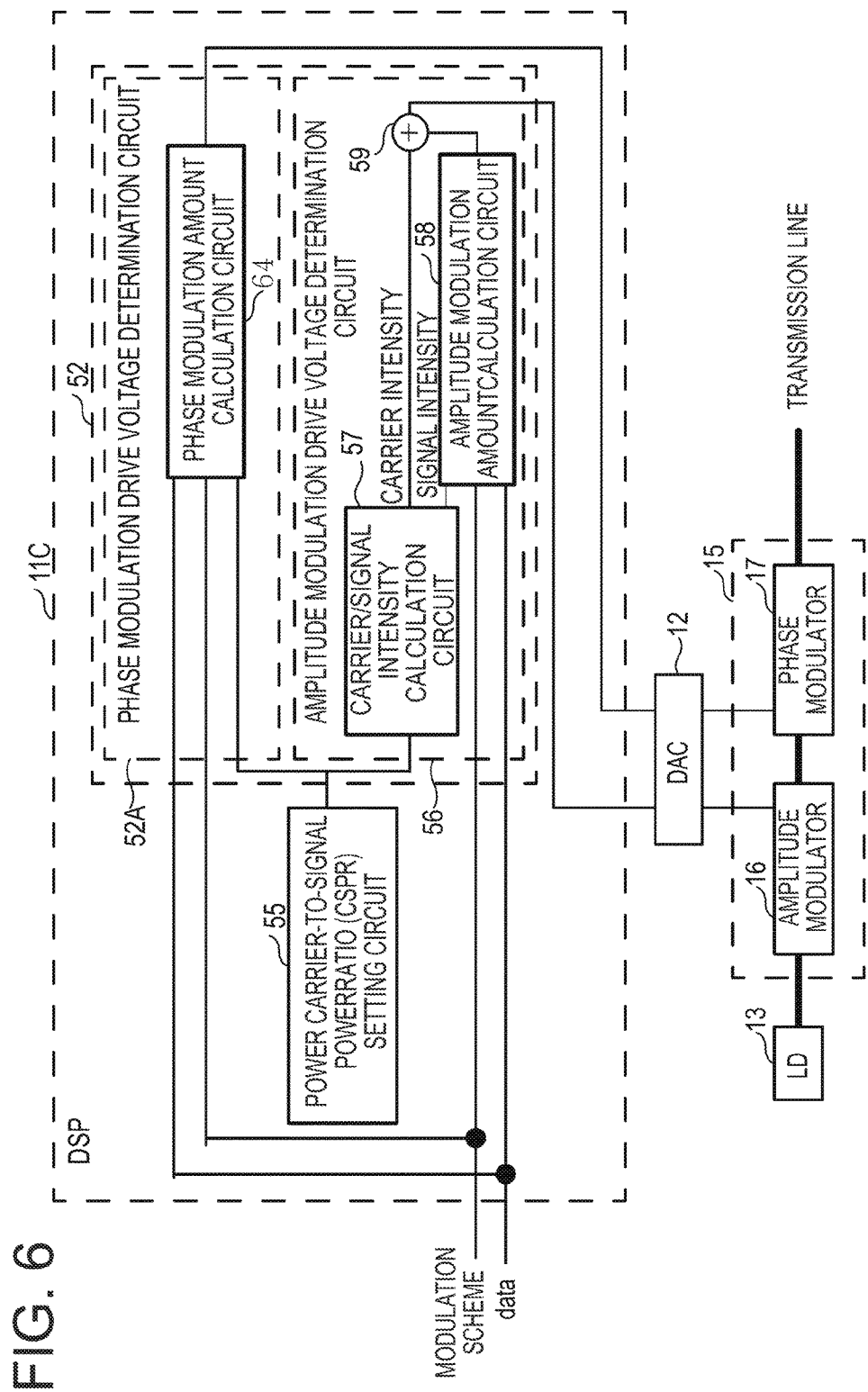
FIG. 6 is a view illustrating another configuration example of the DSP.

FIG. 6 illustrates the configuration of a DSP 11C as another example of the DSP 11. In FIGS. 4 and 5, after the symbol mapping on the I-Q plane, the drive voltage is set, but the DSP 11C directly generates an amplitude voltage and a phase voltage representing the symbol point on the I-Q plane. The amplitude voltage and the phase voltage are drive voltages for driving the optical modulator 15 to generate a modulated light signal satisfying the minimum phase conditions. In this example, the optical modulator 15 is a tandem type modulator including an amplitude modulator 16 and a phase modulator 17 connected in series. However, the optical modulator 15 is not limited thereto but may be a single Mach-Zehnder (MZ) type optical modulator, as will be described later.

The DSP 11C includes a carrier-to-signal power ratio (CSPR) setting circuit 55 for setting the power ratio between carrier light and modulated signal light, and a drive voltage determination circuit 52. The drive voltage determination circuit 52 includes a phase modulation drive voltage determination circuit 52A and an amplitude modulation drive voltage determination circuit 56. The transmission data and the modulation scheme input from the outside to the DSP 11A are input to the phase modulation drive voltage determination circuit 52A and the amplitude modulation drive voltage determination circuit 56, respectively.

The CSPR setting circuit 55 sets the power ratio at which the minimum phase is secured on the receiving side. As an example, the power ratio may be determined based on the result of measurement of the optical signal on the receiving side before operation. Based on the set power ratio, the output light power of the LD 13 is sorted into the power for carrier spectrum $S_C$ and the power for modulated light spectrum $S_M$. The CSPR value set in the CSPR setting circuit 55 is input to the phase modulation drive voltage determination circuit 52A and the amplitude modulation drive voltage determination circuit 56.

The phase modulation drive voltage determination circuit 52A includes a phase modulation amount calculation circuit 64. The phase modulation amount calculation circuit 64 calculates the phase modulation amount of a symbol corresponding to the data value based on the CSPR value, the modulation scheme, and the transmission data. In the case of 16 QAM, the phase modulation amount of each symbol is calculated so that all 16 symbols are included in the single quadrant of the I-Q plane. In the case of the first quadrant, the phase rotation amount of all the symbols is within a range of 0 radian to $\pi/2$ radian. The phase rotation amount of each symbol depends on how far the signal center (the center of the symbol group) is set away from the origin. The signal center is determined by the CSPR value, more specifically, the power of the carrier. The calculated phase modulation amount is output as a voltage for obtaining the phase rotation of the symbol point corresponding to the transmission data.

The amplitude modulation drive voltage determination circuit 56 includes a carrier/signal intensity calculation circuit 57, an amplitude modulation amount calculation circuit 58, and an adder 59. The carrier/signal intensity calculation circuit 57 calculates the intensity of the carrier spectrum $S_C$ and the intensity of the modulated light spectrum $S_M$ based on the CSPR value input from the CSPR setting circuit 55. For convenience, the intensity of the carrier spectrum $S_C$ is called "carrier intensity" and the intensity of the modulated light spectrum $S_M$ is called "signal intensity". The signal intensity is input to the amplitude modulation amount calculation circuit 58. The modulation scheme and the transmission data are also input to the amplitude modulation amount calculation circuit 58. The amplitude modulation amount calculation circuit 58 calculates the amplitude modulation amount of the symbol point corresponding to the transmission data within the single quadrant based on the signal intensity, the modulation scheme, and the transmission data. The calculated amplitude modulation amount is added to the carrier intensity by the adder 59. The addition result is output as a voltage for obtaining the amplitude of the carrier spectrum $S_C$ and the modulated light spectrum $S_M$ carrying the transmission data.

The output of the phase modulation drive voltage determination circuit 52A and the output of the amplitude modulation drive voltage determination circuit 56 are each converted into a high frequency analog electric signal by the DAC 12. The analog electric signal for amplitude modulation is input to the amplitude modulator 16. The analog electric signal for phase modulation is input to the phase modulator 17. The analog electric signal for amplitude modulation and the analog electric signal for phase modulation may be input to the respective modulators after being amplified as necessary.

In the KK detection method, the transmission data is mapped to a symbol point within the single quadrant so as to satisfy the minimum phase conditions, and the symbol point corresponding to the transmission data is defined by the phase and the amplitude. The amplitude modulator 16 amplitude-modulates the continuous light output from the LD 13 with the amplitude modulation drive voltage output from the DAC 12. The amplitude-modulated light is incident on the phase modulator 17. The phase modulator 17 phase-modulates the input light with the phase modulation drive voltage output from the DAC 12. As a result, an optical signal corresponding to the transmission data is output with the waveform spectrum illustrated in FIGS. 2A and 2B.

Figure 7:
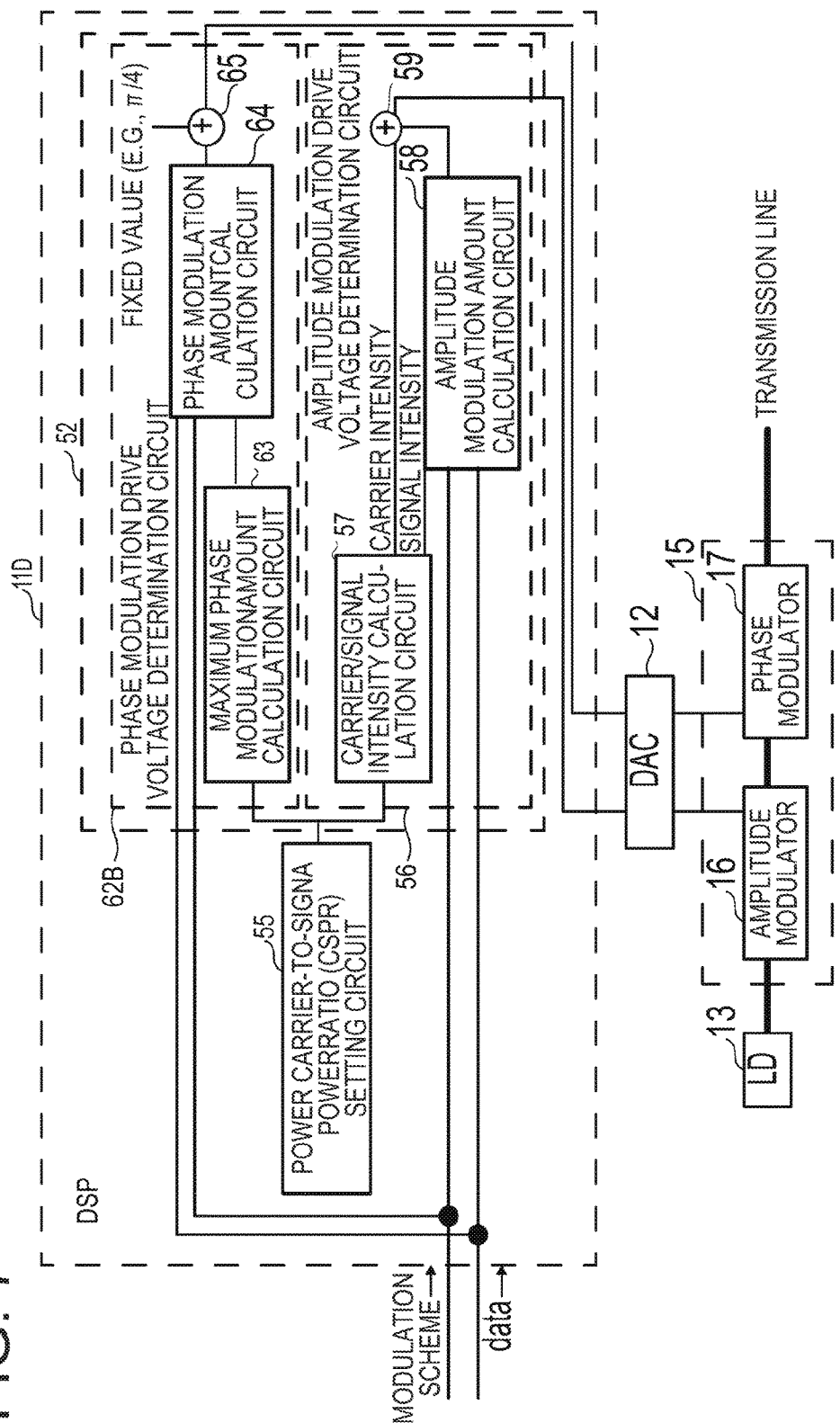
FIG. 7 is a view illustrating another configuration example of the DSP.

FIG. 7 illustrates a DSP 11D as another configuration example of the DSP 11.

The same components as those of the DSP 11C in FIG. 6 are denoted by the same reference numerals and the explanation thereof will not be repeated. The DSP 11D is different from the DPS 11C of FIG. 6 in the configuration of a phase modulation drive voltage determination circuit 62B.

The phase modulation drive voltage determination circuit 62B includes a maximum phase modulation amount calculation circuit 63, a phase modulation amount calculation circuit 64, and an adder 65. The phase modulation drive voltage determination circuit 52A of FIG. 6 directly calculates the phase modulation amount of the corresponding symbol point within the single quadrant based on the input transmission data. The phase modulation drive voltage determination circuit 62B of FIG. 7 calculates the phase modulation amount by regarding the signal center as zero (origin) and then adds a fixed value to convert the calculated phase modulation amount into a phase modulation amount of the symbol point within the single quadrant. For example, when the single quadrant is the first quadrant, the phase modulation amount of the symbol point determined by regarding the origin as the signal center is converted into the phase modulation amount of the symbol point whose signal center is $\pi/4$.

The maximum phase modulation amount calculation circuit 63 calculates the maximum phase modulation amount based on the CSPR value supplied from the CSPR setting circuit 55 and outputs the calculation result to the phase modulation amount calculation circuit 64. The maximum phase modulation amount is determined by power allocated to the modulated light spectrum $S_M$. The phase modulation amount calculation circuit 64 calculates the phase modulation amount of the corresponding symbol point from the modulation scheme and the transmission data input from the outside within the range of the maximum phase modulation amount. The calculated phase modulation amount is input to the adder 65 in which a fixed value for converting the calculated phase modulation amount into a phase modulation amount when the signal center is set within the single quadrant is added. The output value of the adder 65 is input to the DAC 12 as a voltage value for driving the phase modulator 17. With this configuration as well, the transmission data is mapped to a symbol point within the single quadrant so as to satisfy the minimum phase conditions, thereby enabling the KK detection on the receiving side.

<Example of Tandem Type Optical Modulator>

Figure 8:
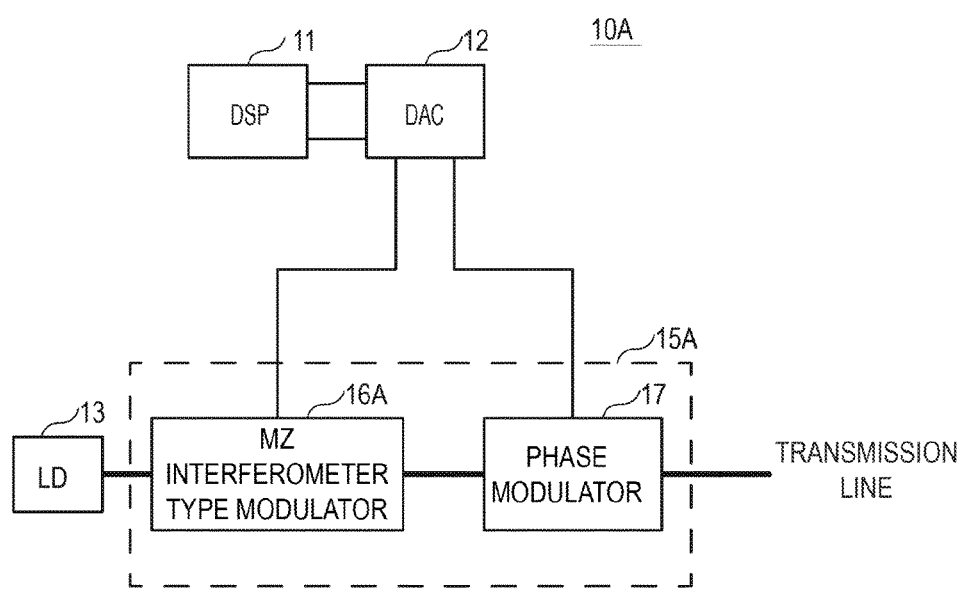
FIG. 8 illustrates a configuration example of a tandem type optical modulator.

FIG. 8 illustrates a configuration example of a tandem type optical modulator 15A used in an optical transmitter 10A. The optical modulator 15A uses an MZ interferometer type modulator 16A as an amplitude modulator. The MZ interferometer type modulator 16A is a modulator made of an electro-optic material such as $LiNbO_3$. A voltage is applied to a pair of optical waveguides of an MZ interferometer to change the refractive index, thereby changing the interference state of light propagating through the two optical waveguides to apply a desired amplitude modulation.

The phase modulator 17 is a phase shifter that is not an MZ interferometer type, and uses, for example, an electro-optic crystal. When a voltage is applied to the electro-optic crystal to change the refractive index, a desired phase rotation occurs. The MZ interferometer type modulator 16A serving as an amplitude modulator and the phase modulator 17 may be monolithically formed with the same electro-optic material. Further, the arrangement of the MZ interferometer type modulator 16A and the phase modulator 17 may be reversed. The output of the optical modulator 15A is an optical signal transmitted from the optical transmitter 10A and satisfies the minimum phase system.

Figure 9:
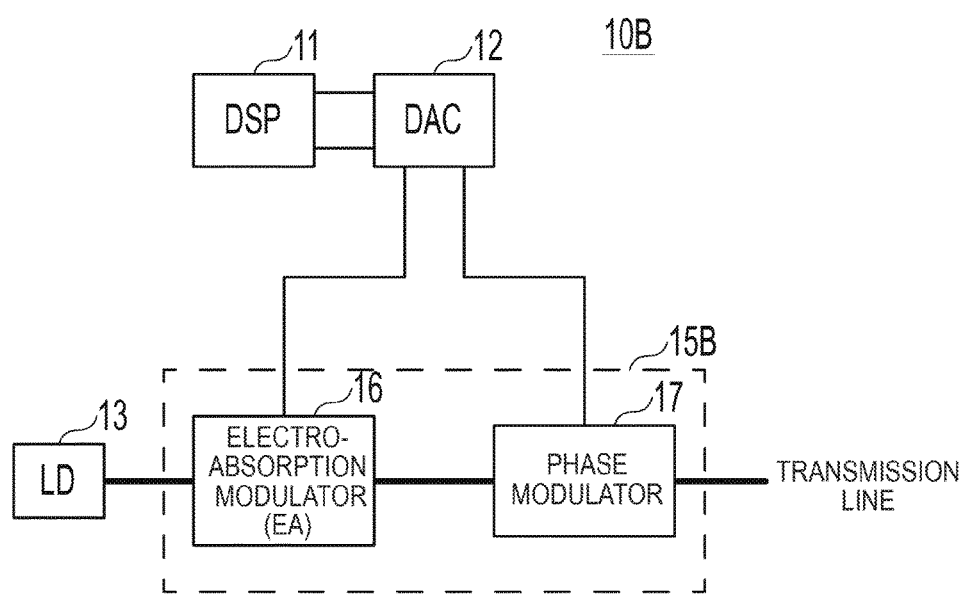
FIG. 9 illustrates another configuration example of the tandem type optical modulator.

FIG. 9 illustrates a configuration example of a tandem type optical modulator 15B used in an optical transmitter 10B. The optical modulator 15B includes an electro-absorption (EA) modulator 16 serving as an amplitude modulator and a phase modulator 17. Since the EA modulator 16 utilizes the electric field absorption effect of a semiconductor, a band gap changes and the light absorption amount changes when a voltage is applied to a quantum well. The EA modulator is smaller in size and lower in drive voltage than the $LiNbO_3$ modulator. Further, the EA modulator may be integrated with the LD 13, which is advantageous for downsizing the optical transmitter 10B.

Figure 10:
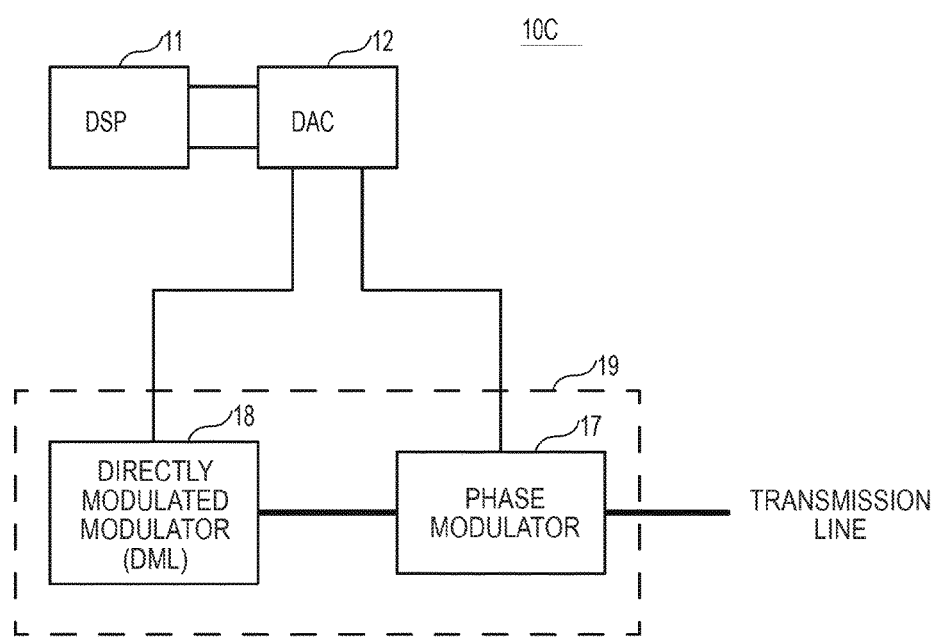
FIG. 10 illustrates a further configuration example of the tandem type optical modulator.

FIG. 10 illustrates an optical modulator 19 as another example of the tandem type optical modulator. The optical modulator 19 includes a directly modulated laser (DML) 18 and a phase modulator 17. The DML 18 modulates the output intensity (amplitude) by directly modulating a current injected into a semiconductor laser with the amplitude modulation drive voltage output from the DAC 12. The DML 18 is simple in configuration and fabrication. With the DML 18, a large extinction ratio may not be expected due to the semiconductor refractive index change (chirping) with the change in current value. However, this extinction ratio problem may be overcome by a combination of the DML 18 with the KK detection method. Therefore, even a modulation device having a low extinction ratio may be suitably used to contribute to downsizing, cost reduction, and light loss reduction. The receiving side may directly detect the intensity from the PD output and correctly extract the phase information from the amplitude.

<Example of Single MZ Interferometer Type Modulator>

Figure 11A:
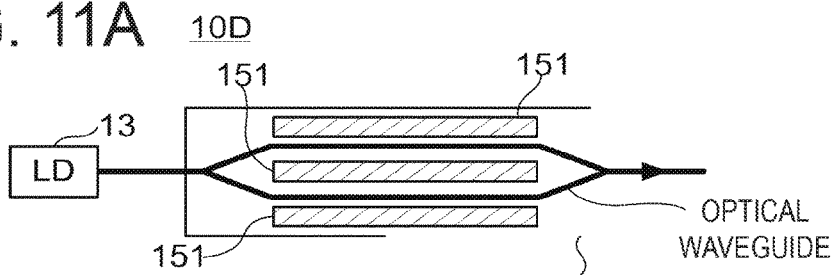
FIGS. 11A to 11E illustrate an example of using one Mach-Zehnder type optical modulator.
Figure 11B:
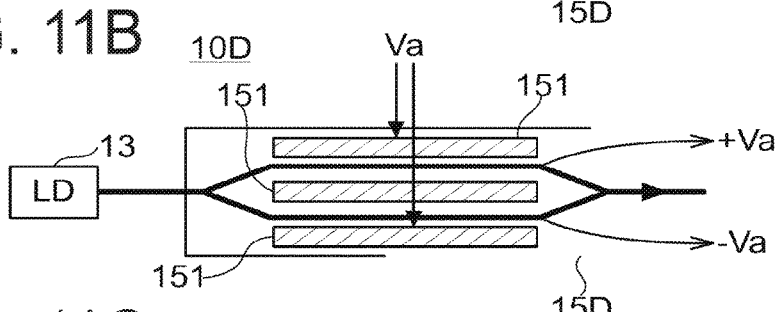
Figure 11C:
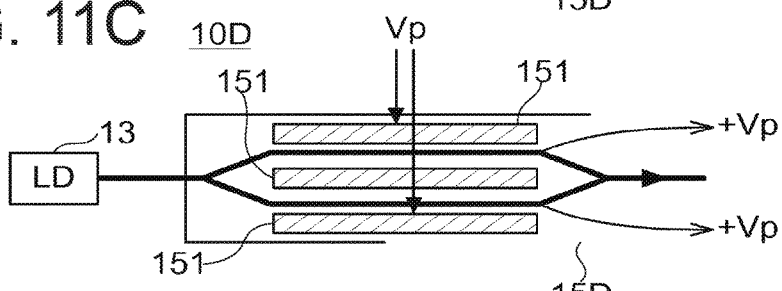

FIGS. 11A to 11E illustrate an example of a single MZ interferometer type optical modulator 15D used in an optical transmitter 10D. In the MZ interferometer type optical modulator 15D, electrodes 151 are arranged in the vicinity of a pair of optical waveguides and a voltage giving a refractive index change is applied to the optical waveguides (FIG. 11A). By changing the refractive index by applying a voltage Va to the pair of optical waveguides, the interference state of light propagating through the two optical waveguides is changed (differential mode) to apply a desired amplitude modulation (FIG. 11B). The dashed arrows indicate application of voltages with opposite phases. In contrast, when operating in the common mode where a voltage Vp applied to the pair of optical waveguides is equivalent to the changed refractive index, a desired phase modulation is applied (FIG. 11C).

Figure 11D:
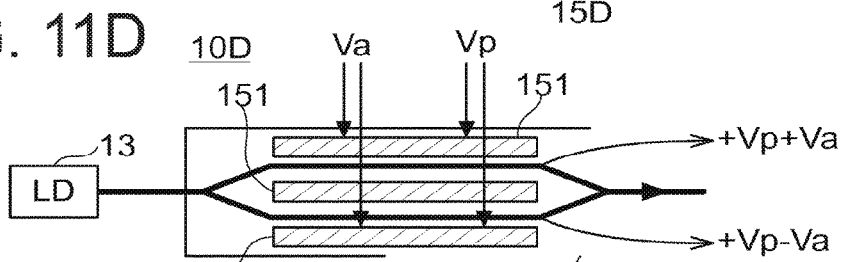

By applying the amplitude modulation drive voltage Va to the modulator in the differential mode and applying the phase modulation drive voltage Vp to the modulator in the common mode, it is possible to generate a signal satisfying the minimum phase conditions (FIG. 11D). In this case, a voltage Vp+Va is applied to one optical waveguide and a voltage Vp−Va is applied to the other optical waveguide.

Figure 11E:
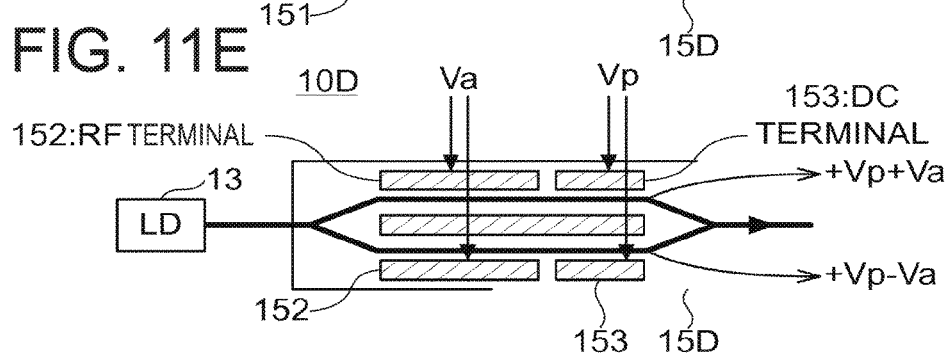

By applying the amplitude modulation drive voltage Va to an RF terminal 152 of the MZ interferometer type optical modulator 15D and applying the phase modulation drive voltage Vp to a DC terminal 153 of the MZ interferometer type optical modulator 15D, it is possible to generate a signal satisfying the minimum phase conditions (FIG. 11E). In this manner, it is possible to generate a signal satisfying the minimum phase conditions by the drive voltages that simultaneously generate the amplitude modulation and the phase modulation.

<Configuration Example 1 of Adding Bias>

FIG. 12 illustrates a configuration example in which a bias is added to a tandem type optical modulator. An optical transmitter 20 includes a direct current (DC) power supply 21 and an adder 22 in addition to the device configuration of FIG. 2A. The drive voltage supplied from the DAC 12 to the phase modulator 17 is a voltage that implements the phase modulation amount of a symbol point. By applying a bias voltage to this drive voltage, the output voltage of the DAC 12 may be suppressed.

The optical input/output characteristics of the phase modulator 17 when no bias voltage is added are expressed by Eout(t)=Ein(t)exp(jδ(t)Δφ). Herein, Ein(t) is the input optical signal to the phase modulator 17, Eout(t) is the output optical signal from the phase modulator 17, δ(t) is the normalized input voltage (i.e., the normalized phase modulation DAC output voltage) input to the phase modulator 17, and Δφ is the variable phase width of the phase modulator 17 itself.

The normalized input voltage δ(t) input to the phase modulator 17 is within the range of (φmin/Δφ)<δ(t)<(φmax/Δφ). Herein, φmin and φmax are the minimum phase rotation amount and the maximum phase rotation amount determined by the modulation method and the CSPR value, respectively.

Figure 13:
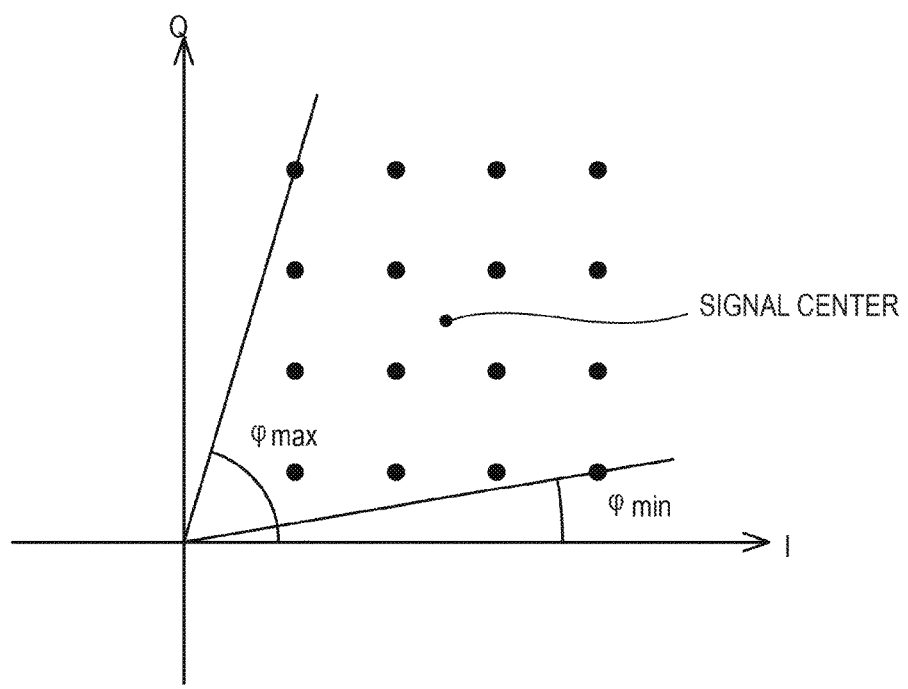
FIG. 13 is a view for explaining the minimum phase rotation amount $\phi$min and the maximum phase rotation amount $\phi$max.

FIG. 13 is a view for explaining the minimum phase rotation amount φmin and the maximum phase rotation amount φmax. As described above, the signal center within the single quadrant is determined by the CSPR value and the number of symbol points is determined by the modulation scheme. The minimum phase rotation amount φmin and the maximum phase rotation amount φmax are determined by the CSPR value and the modulation scheme.

Referring back to FIG. 12, the optical input/output characteristics of the phase modulator 17 when a bias voltage is added are expressed by Eout(t)=Ein(t)exp[(j(δ(t)+δbias)Δφ). Herein, δbias is an added bias voltage. The normalized input voltage δ(t) input to the phase modulator 17 is within the range of (δmin/Δφ)−δbias<δ(t)<(φmax/Δφ)−bias, thereby allowing reduction of the output voltage δ(t) of the DAC 12 to the phase modulator 17.

<Configuration Example 2 of Adding Bias>

FIG. 14 illustrates another configuration example in which a bias is added to the tandem type optical modulator. In this configuration example, a bias voltage is added to the drive voltage applied to the amplitude modulator 16. The optical transmitter 20 includes a DC power supply 23 and an adder 24 in addition to the device configuration of FIG. 2A. The drive voltage supplied from the DAC 12 to the amplitude modulator 16 is a voltage that implements the amplitude modulation amount of a symbol point. By applying the bias voltage to this drive voltage, the output voltage of the DAD 12 may be suppressed.

The optical input/output characteristics of the amplitude modulator 16 when no bias voltage is added are expressed by Pout(t)=Pin(t)cos 2[(π/2)(½−k(δ(t)−½))]. Herein, Pin(t) is the input light power to the amplitude modulator 16, Pout(t) is the output light power signal from the amplitude modulator 16, δ(t) is the normalized input voltage (i.e., the normalized amplitude modulation DAC output voltage) input to the amplitude modulator 16, and k is a coefficient uniquely determined by the extinction ratio of the amplitude modulator 16.

The normalized input voltage δ(t) input to the amplitude modulator 16 is within the range of:

$$\frac{1}{k}\left(\frac{1}{2}-\frac{2}{\pi}\arccos\sqrt{A_{min}}\right)+\frac{1}{2} < \qquad [\text{Eq. 1}]$$
$$\delta(t) < \frac{1}{k}\left(\frac{1}{2}-\frac{2}{\pi}\arccos\sqrt{A_{max}}\right)+\frac{1}{2}$$

Herein, Amin and Amax are the minimum value and the maximum value of Pout/Pin determined by the modulation scheme and the CSPR value. The value of Pout/Pin correlates with a distance, that is, amplitude from the origin to a symbol point within the single quadrant.

The optical input/output characteristics of the phase modulator 17 when a bias voltage is added are expressed by Pout(t)=Pin(t)cos 2[(π/2)(½−k(δ(t)+δbias−½))]. Herein, δbias is an added bias voltage. The normalized input voltage δ(t) input to the amplitude modulator 16 is within the range of:

$$\frac{1}{k}\left(\frac{1}{2}-\frac{2}{\pi}\arccos\sqrt{A_{min}}\right)+\frac{1}{2} - \delta_{bias} < \qquad [\text{Eq. 2}]$$
$$\delta(t) < \frac{1}{k}\left(\frac{1}{2}-\frac{2}{\pi}\arccos\sqrt{A_{max}}\right)+\frac{1}{2} - \delta_{bias},$$

thereby allowing reduction of the output voltage δ(t) of the DAC 12 to the amplitude modulator 16.

<Configuration Example 3 of Adding Bias>

Figure 15:
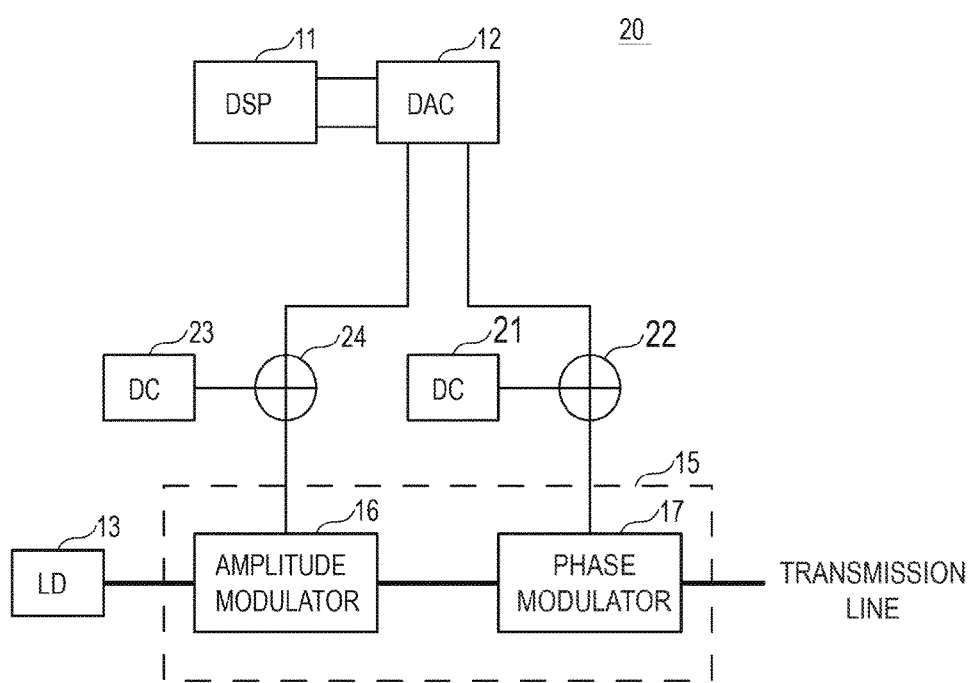
FIG. 15 illustrates a further configuration example in which a bias is added to a tandem type optical modulator.

FIG. 15 illustrates another configuration example in which a bias is added to the tandem type optical modulator. In this configuration example, a bias voltage is added to the drive voltage applied to the amplitude modulator 16 and the drive voltage applied to the phase modulator 17. The optical transmitter 20 includes a DC power supply 23 and an adder 24 for the amplitude modulator 16, and a DC power supply 21 and an adder 22 for the phase modulator 17 in addition to the device configuration of FIG. 2A. With this configuration, it is possible to reduce both the output voltage of the DAC to the amplitude modulator 16 and the output voltage of the DAC to the phase modulator 17.

<Configuration Example 4 of Adding Bias>

FIG. 16 illustrates Configuration Example 4 in which a bias is added to the tandem type optical modulator. Configuration Example 4 is different from Configuration Example 2 in that the bias voltage is directly supplied. For example, when a Mach-Zehnder (MZ) interferometer type optical modulator is used as the amplitude modulator 16, since a typical MZ interferometer type modulator has two terminals (RF terminal and DC terminal), the bias voltage may be directly applied in addition to the drive voltage. With such a configuration, it is possible to implement application of a bias without adding a component.

Although it is possible to directly apply a bias voltage using a Mach-Zehnder (MZ) interferometer type optical modulator as the phase modulator 17, a disadvantage of high cost of the phase modulator itself overrides an advantage of cutting the cost of a component for applying a bias. Therefore, when an inexpensive phase modulator having two or more terminals is developed in the future, the above-mentioned advantage will be achieved by applying the drive voltage and the bias voltage to the DC terminal.

<Operation Flow 1>

Figure 17:
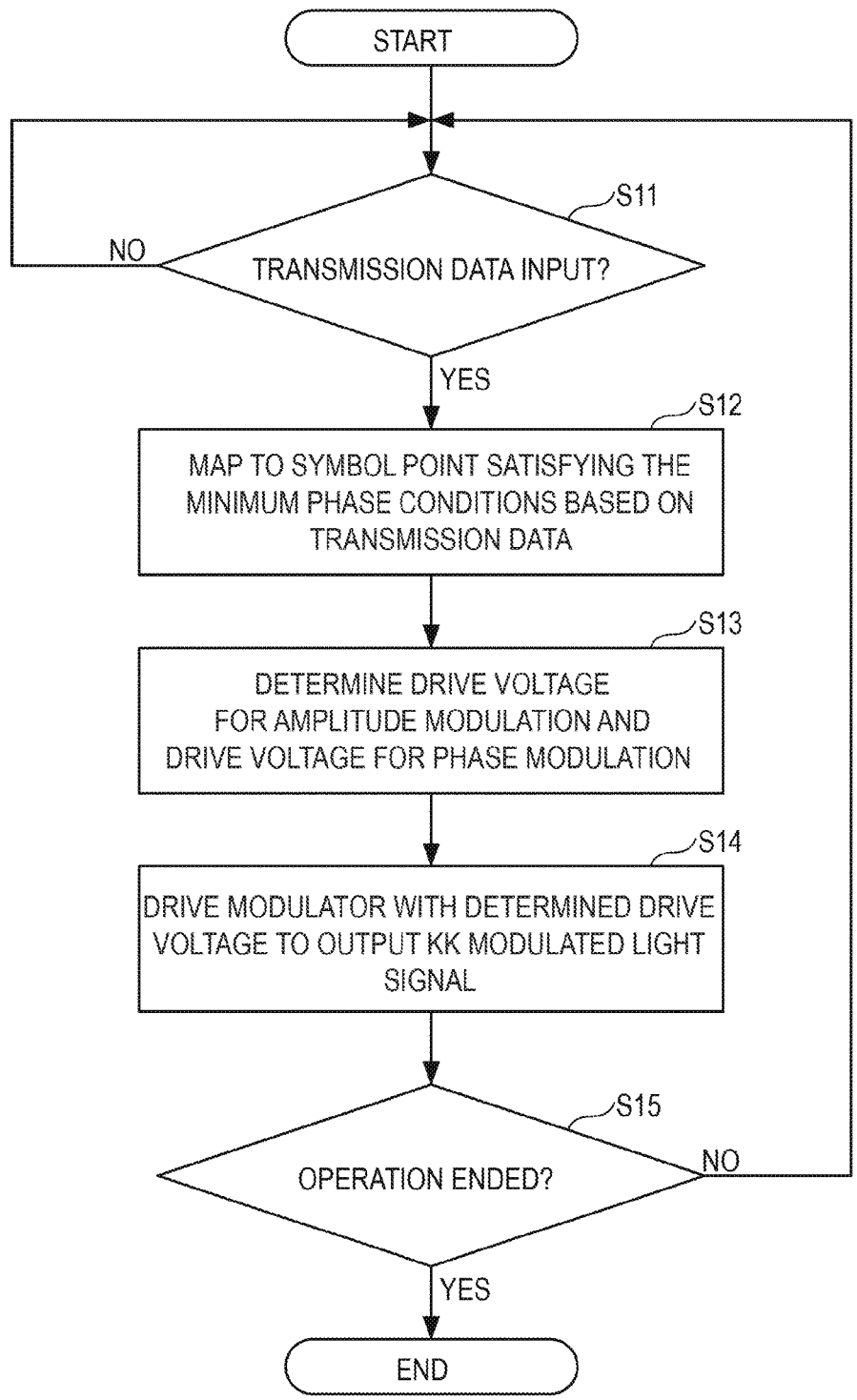
FIG. 17 is a flowchart of a modulation method according to an embodiment.

FIG. 17 is a flowchart of a modulation method performed by the optical transmitter 10 (or 20). This operation flow is applied to a configuration in which a symbol mapping is performed with IQ illustrated in FIGS. 4 and 5 and then divided into an amplitude and a phase.

When transmission data is input ("YES" in S11), the DSP 11 maps to a symbol point satisfying the minimum phase conditions based on the transmission data (S12). Next, a drive voltage representing the amplitude modulation amount of each mapped symbol and a drive voltage representing the phase modulation amount thereof are calculated (S13). Next, the optical modulator 15 is driven with the drive voltage representing the amplitude modulation amount and the drive voltage representing the phase modulation amount to output a KK modulated light signal (S14). The optical signal output from the optical modulator 15 has a signal waveform illustrated in FIGS. 2A and 2B and includes a carrier spectrum $S_C$ of sufficiently high power and a modulated light spectrum $S_M$ carrying data. During the operation of the optical transmitter 10 ("NO" in S15), steps S12 to S15 are repeated.

<Operation Flow 2>

Figure 18:
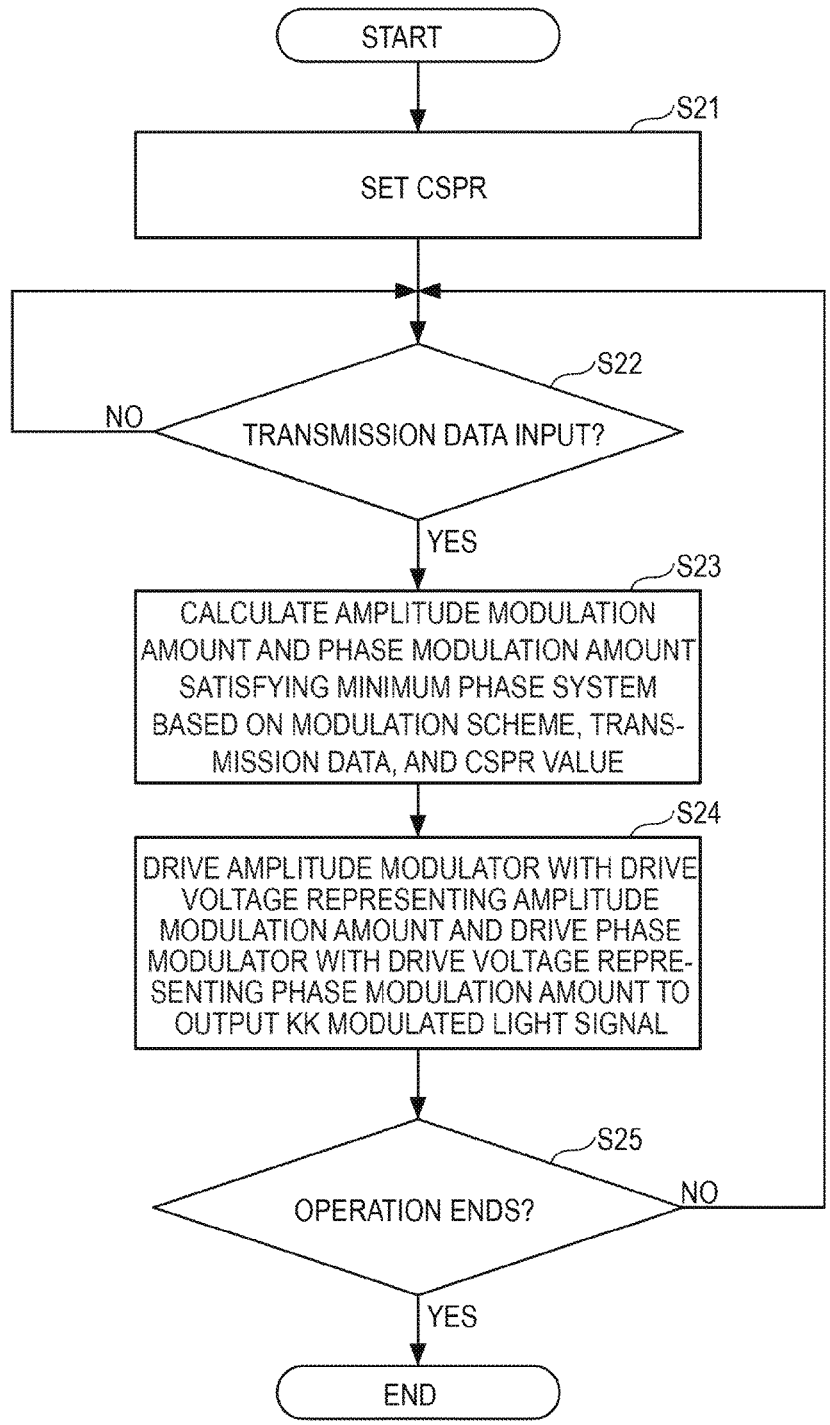
FIG. 18 is a flowchart of a modulation method according to an embodiment.

FIG. 18 is a flowchart illustrating another operation flow of the modulation method performed by the optical transmitter 10 (or 20). This operation flow is applied to the configurations of FIGS. 6 and 7 which determine the amplitude modulation amount and the phase modulation amount directly corresponding to the symbol point based on the input data, the modulation scheme, and the CSPR. The CSPR is set in the DSP 11 (S21). As an example, the CSPR is determined based on a result of light reception using a test signal before operation. During operation, when transmission data is input ("YES" in S22), the DSP 11 calculates the amplitude modulation amount and the phase modulation amount corresponding to a symbol point satisfying the minimum phase conditions based on the modulation scheme used, the transmission data, and the set CSPR value (S23). The amplitude modulator 16 is driven with a drive voltage representing the amplitude modulation amount and the phase modulator 17 is driven by a drive voltage representing the phase modulation amount to output a KK modulated light signal (S24). The optical signal output from the optical modulator 15 has a signal waveform illustrated in FIGS. 2A and 2B and includes a carrier spectrum $S_C$ of sufficiently high power and a modulated light spectrum $S_M$ carrying data. During the operation of the optical transmitter 10 ("NO" in S25), steps S12 to S15 are repeated.

On the receiving side, the optical signal of the signal waveform of FIGS. 2A and 2B is received by the PD. A photocurrent I output from the PD is proportional to the square of the electric field intensity of the received optical signal. The photocurrent is digitally-sampled at, for example, twice the sampling rate (twice the bandwidth of the modulated light spectrum $S_M$). The DSP obtains the electric field intensity (amplitude) and acquires the phase information by Hilbert transformation.

With this method, the configuration of the optical modulator 15 may be simplified to reduce, for example, the size, cost, and optical loss of the optical transmitter. In addition, since the optical modulator 15 employs the modulation scheme in which a symbol does not shift the extinction point, it is possible to use an optical device whose extinction ratio is not so high, which contributes to cost reduction.

In the above examples, the modulation scheme of 16 QAM is used. However, the present disclosure is not limited to these examples but may be applied to other multi-level modulation such as 8 QAM, 32 QAM, 64 QAM, DP-QPSK, and the like. In either case, the amplitude and the phase are modulated so as to fall all symbol points into the single quadrant (to satisfy the minimum phase conditions). The quadrant in which the symbol points are arranged is not limited to the first quadrant but, for example, all the symbol points may be arranged in the third quadrant. Even in this case, the range of phase shift from the minimum phase to the maximum phase is between 0 and $\pi/2$. In the case of DP-QPSK, by arranging the tandem type optical modulator 15 for each of X polarization and Y polarization, it is possible to significantly reduce the size and configurational complication as compared with a case where the optical modulator is configured by a MZ interferometer type optical modulator. When the tandem type optical modulator is used, there is no limitation on the arrangement order of the phase and the amplitude.

<Application to Optical Transmission Apparatus>

Figure 19:
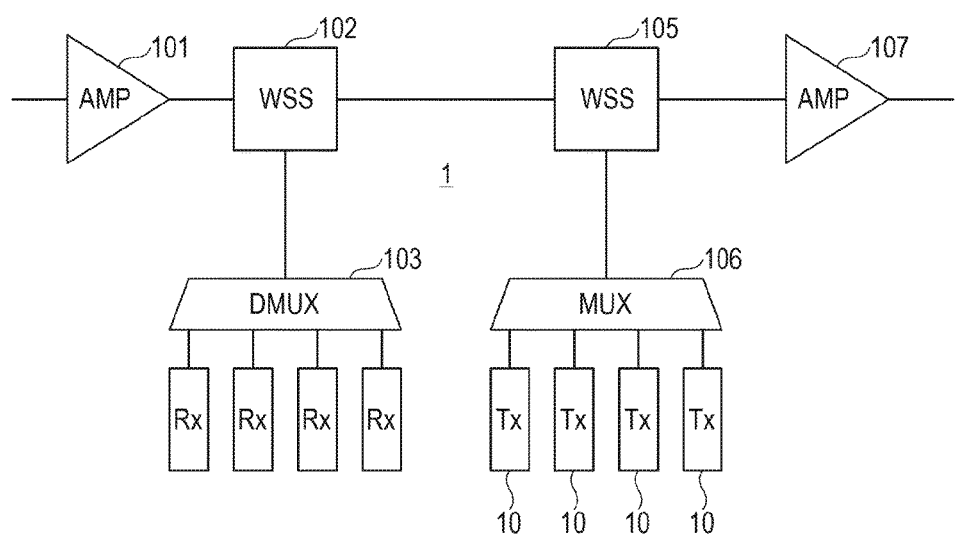
FIG. 19 is a schematic view of an optical transmission apparatus in which the optical transmitter according to the embodiment is used.

FIG. 19 is a block diagram illustrating a configuration example of an optical transmission apparatus 1 to which the optical transmitter 10 (or 20) of the embodiment is applied. Illustratively, the optical transmission apparatus 1 is a reconfigurable optical add-drop multiplexer (ROADM). Although not illustrated, an apparatus control circuit for controlling the overall operation of the ROADM may be included in the ROADM. The optical transmission apparatus 1 is an example of an element (NE) of an optical network (optical transmission system).

An optical amplifier (labeled with "AMP") 101 on the receiving side receives and amplifies light (WDM light) transmitted through an input optical transmission line and outputs the amplified optical signal to a wavelength selective switch (labeled with "WSS") 102. An optical amplifier 107 on the transmitting side amplifies the transmission light (WDM light) input from a WSS 105 and transmits it to an output optical transmission line. The optical amplifiers 101 and 107 are, for example, rare-earth-doped optical fiber amplifiers such as erbium-doped optical fiber amplifiers (EDFAs).

The optical transmission apparatus 1 has a function of dropping, adding, and passing light of any wavelength included in the WDM light. For example, the optical transmission apparatus 1 may transmit the received WDM light input from the optical amplifier 101 to an optical transmission line of another route (Degree) in the unit of wavelength of light included in the WDM light, branch (drop) the received WDM light to an optical receiver (Rx), or pass the received WDM light toward the optical amplifier 107. The "optical transmission line of another route" refers to an optical transmission line corresponding to a route different from the illustrated optical transmission line. Further, it is possible to insert (add) the WDM light received from the optical transmission line of another route or transmitted light from the optical transmitter into (to) the received WDM light input from the direction of the optical amplifier 101 in the unit of wavelength.

As illustrated in FIG. 19, the optical transmission apparatus 1 includes the WSS 102, the WSS 105, a demultiplexer (DMUX) 103, and a multiplexer (MUX) 106. The WSS 102 branches the input WDM light and outputs the branched light to the demultiplexer 103 and the WSS 105. The output destination of the branched light may include an optical transmission line of another route. The branched light output to the demultiplexer 103 is referred to as "drop light" and the branched light output to the WSS 105 is referred to as "through light".

The WSS 105 selects and outputs the through light input from the WSS 102 and the added light input from the multiplexer 106 in the unit of wavelength. The wavelength selection target in the WSS 105 may include any wavelength included in the WDM light input from the optical transmission line of another route.

Each of the WSS 102 and the WSS 105 has a function of connecting the WDM light input to an input port to one of output ports in the unit of wavelength and a function of adjusting transmitted light power in the unit of wavelength. The "adjusting transmitted light power" is implemented by adjusting attenuation (or loss) of light.

When focusing on the function of adjusting the transmitted light power (attenuation function), the WSS is an example of a variable optical attenuator (VOA). The optical switch function and the attenuation function of the WSS 102 and the WSS 105 are implemented by using an element which may change the internal optical path by spatially varying the reflection direction of input light (beam). This element is referred to as "spatial light modulation element". An example of the spatial light modulation element may be an element using an LCOS (Liquid Crystal on Silicon) technology or an MEMS (Micro Electro Mechanical System) technology. The spatial light modulation element may adjust the wavelength and optical power of the light beam coupled to the output port by adjusting the spatial reflection direction of the input light beam. Therefore, the spatial light modulation element may vary the transmission band of light to the output port and may vary the power of the light output from the output port. By using such a spatial light modulation element for the WSS 102 and the WSS 105, it is possible to support a flexible grid and colorless in the optical transmission apparatus 1.

The demultiplexer 103 wavelength-demultiplexes the drop light input from the WSS and outputs it to the optical receiver Rx. When the optical receiver Rx is capable of coherent reception, the optical receiver Rx may selectively receive light of a targeted reception wavelength even when lights of different wavelengths are input. Therefore, the demultiplexer 103 may be replaced with an optical coupler that branches the input drop light to the optical receiver Rx.

The multiplexer 106 wavelength-multiplexes the added light input from an optical transmitter (Tx) 10 and outputs it to a WSS. The multiplexer 106 wavelength-multiplexes the added light input from the optical transmitter (Tx) 10 and outputs it to the WSS 105.

One or both of the demultiplexer 103 and the multiplexer 106 may be constituted by a variable transmission band filter such as, for example, the WSS or an optical coupler. The optical transmitter 10 may include, for example, the processor 11 (see, e.g., FIGS. 2A and 2B) and a coherent signal light transmitting unit and the present disclosure may be applied to the optical modulator 15 included in the coherent signal light transmitting unit.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An optical transmitter comprising:
an optical modulator configured to multilevel-modulate light output from a light source; and
a processor configured to output a first drive voltage for driving the optical modulator according to an amplitude component when transmission data is symbol-mapped so that all symbols fall into a single quadrant and a second drive voltage for driving the optical modulator according to a phase component when the transmission data is symbol-mapped so that all symbols fall into a single quadrant,
wherein a phase shift of phase modulation by the second drive voltage output from the processor is greater than 0 and less than $\pi/2$.

2. The optical transmitter according to claim 1, wherein the optical modulator outputs an optical signal having a waveform including a modulated light spectrum carrying the transmission data and a carrier spectrum protruding at an edge of the modulated light spectrum.

3. The optical transmitter according to claim 2, wherein the processor outputs the first drive voltage based on an intensity of the carrier spectrum and the amplitude component.

4. The optical transmitter according to claim 2, wherein the processor includes:
a setting circuit that sets a carrier-to-signal power ratio; and
a first drive voltage determination circuit that calculates the intensity of the carrier spectrum and the intensity of the modulated light spectrum based on the carrier-to-signal power ratio and determines the first drive voltage from the intensity of the carrier spectrum and the intensity of the modulated light spectrum.

5. The optical transmitter according to claim 4, wherein the first drive voltage determination circuit calculates the amplitude modulation amount of the transmission data based on the intensity of the modulated light spectrum, the transmission data, and the modulation scheme.

6. The optical transmitter according to claim 1, wherein the optical modulator includes an amplitude modulator and a phase modulator connected in series.

7. The optical transmitter according to claim 6, wherein the amplitude modulator is a directly modulated laser.

8. The optical transmitter according to claim 1, wherein the optical modulator is one Mach-Zehnder optical modulator.

9. The optical transmitter according to claim 8, wherein the processor outputs the first drive voltage in a differential mode and outputs the second drive voltage in a common mode.

10. The optical transmitter according to claim 9, wherein the processor outputs the first drive voltage to an RF terminal and outputs the second drive voltage to a DC terminal.

11. The optical transmitter according to claim 1, wherein the processor includes:
a setting circuit that sets a carrier-to-signal power ratio;
a first drive voltage determination circuit that determines the first drive voltage based on the carrier-to-signal power ratio, the transmission data, and a modulation scheme; and
a second drive voltage determination circuit that determines the second drive voltage based on the carrier-to-signal power ratio, the transmission data, and the modulation scheme.

12. An optical transmission apparatus comprising:
a first optical amplifier and a second optical amplifier;
an optical receiver coupled to the first optical amplifier, configured to receive light of a targeted reception wavelength from the first optical amplifier; and
an optical transmitter coupled to the second optical amplifier, configured to include an amplitude modulator to which a first drive voltage is applied and a phase modulator to which a second drive voltage is applied, the phase modulator being connected in series with the amplitude modulator, output an optical signal having a waveform including a modulated light spectrum in which transmission data output from the transmitter is modulated and a carrier spectrum protruding at an edge of the modulated light spectrum, wherein the transmission data output from the transmitter is symbol-mapped so that all symbols fall into a single quadrant.

13. An optical modulation method in an optical transmission apparatus, the method comprising:

generating an optical signal by which a phase shift of phase modulation by a second drive voltage is greater than 0 and less than $\pi/2$, based on a first drive voltage for driving an optical modulator according to an amplitude component when transmission data is symbol-mapped so that all symbols fall into a single quadrant and the second drive voltage for driving the optical modulator according to a phase component when the transmission data is symbol-mapped so that all symbols fall into a single quadrant.

14. The optical modulation method according to claim 13, wherein the optical signal having a waveform includes a modulated light spectrum carrying the transmission data and a carrier spectrum protruding at an edge of the modulated light spectrum.

15. The optical modulation method according to claim 14, comprising:

calculating an amplitude modulation amount of a transmission data and a phase modulation amount of the transmission data based on the intensity of the modulated light spectrum, the transmission data, and the modulation scheme;

determining the first drive voltage for driving the optical modulator according to the amplitude modulation amount of the transmission data; and determining the second drive voltage for driving the optical modulator according to the phase modulation amount of the transmission data.

* * * * *